May 18, 1948.  W. E. MARTIN  2,441,710
TRAILER
Filed Sept. 21, 1944  8 Sheets-Sheet 5
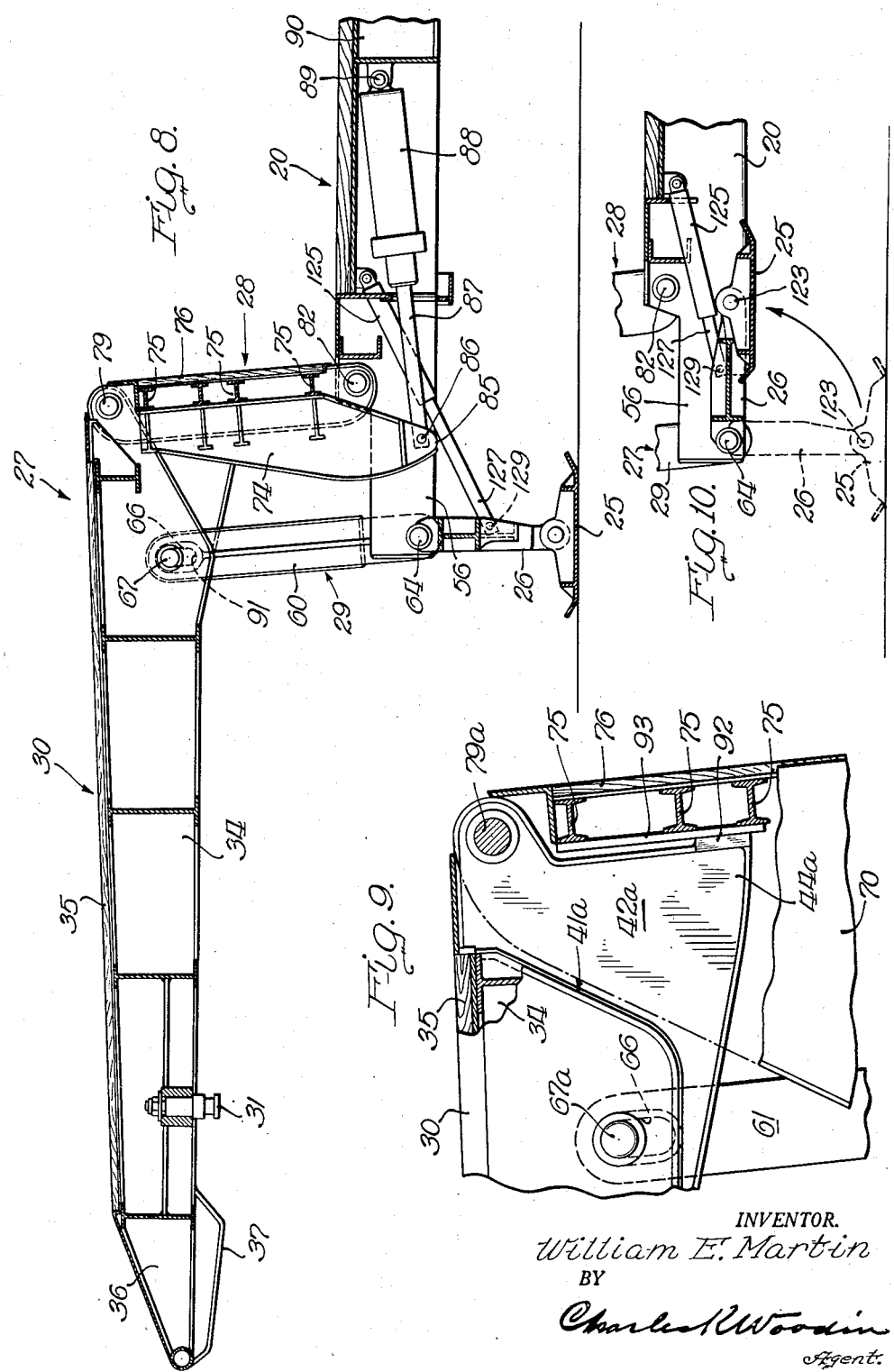
INVENTOR.
William E. Martin
BY
Charles R Woodin
Agent.

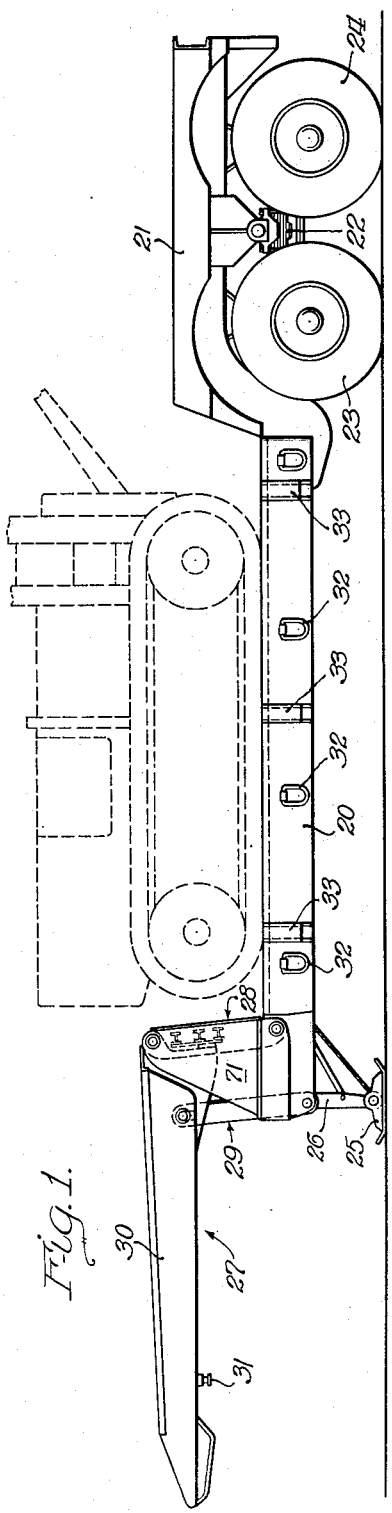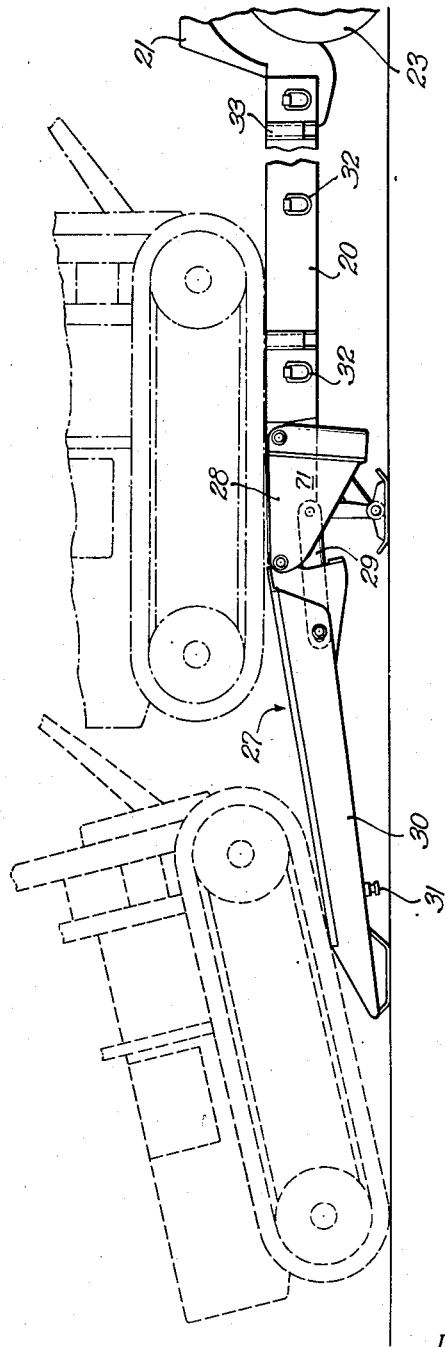

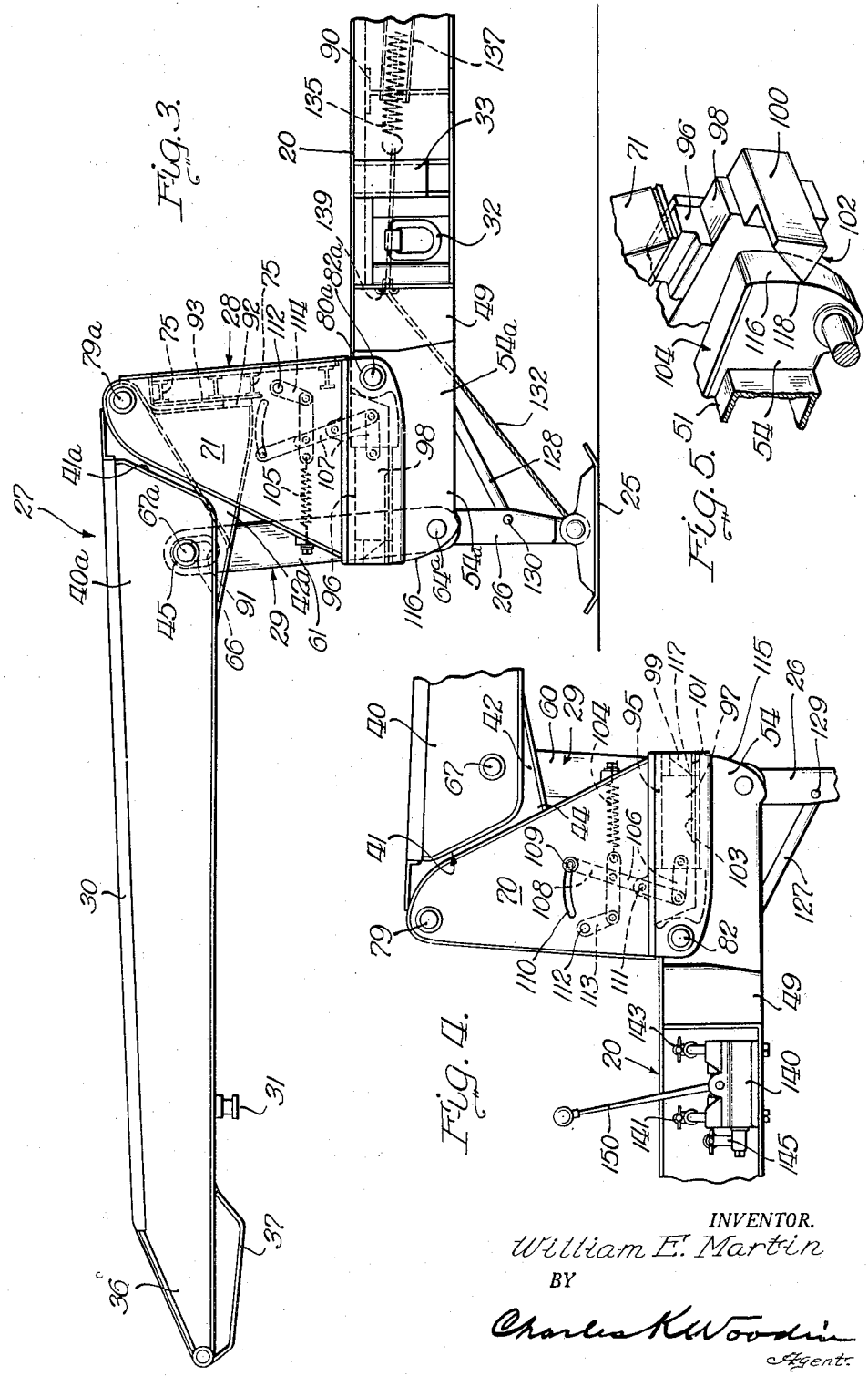

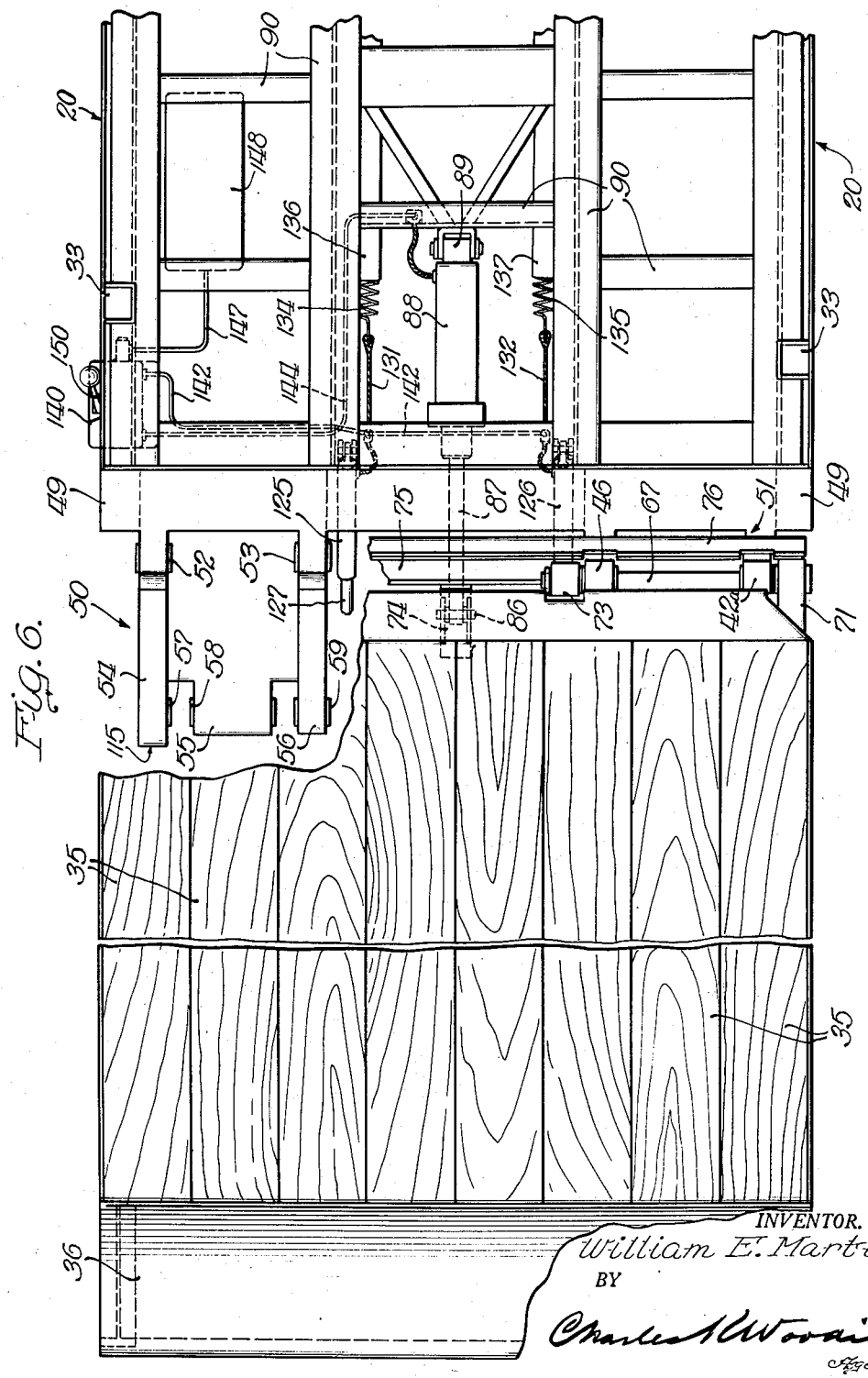

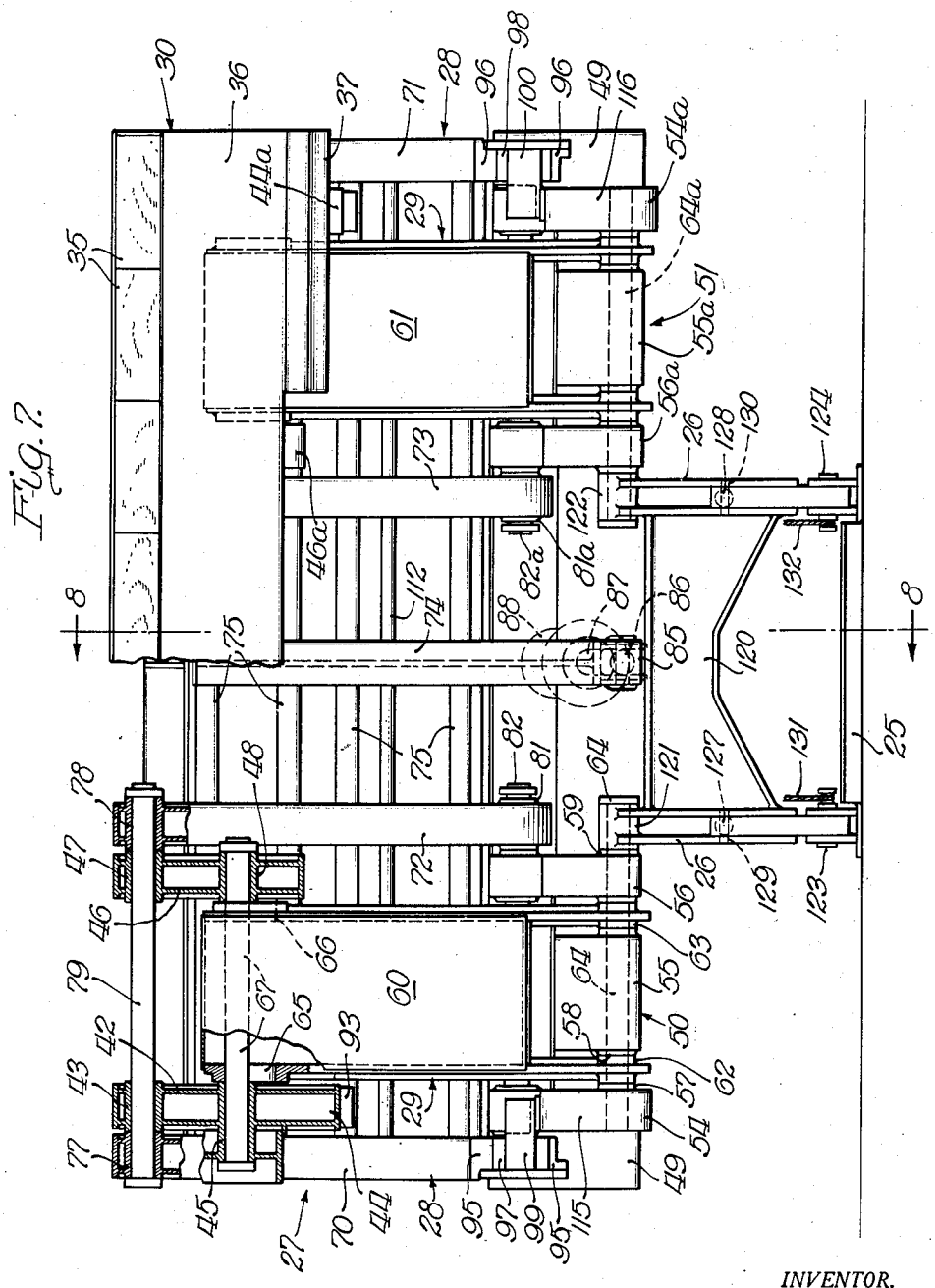

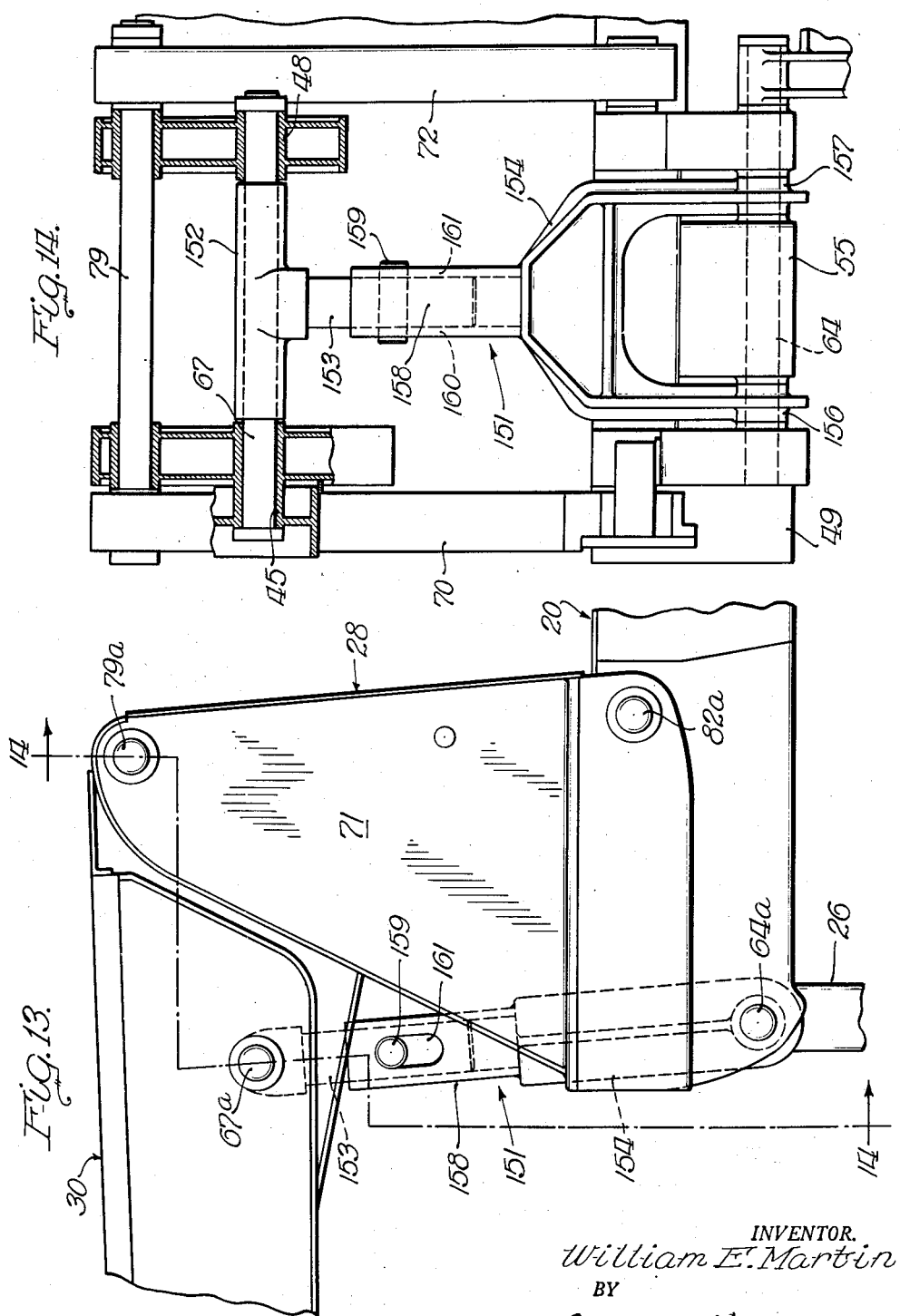

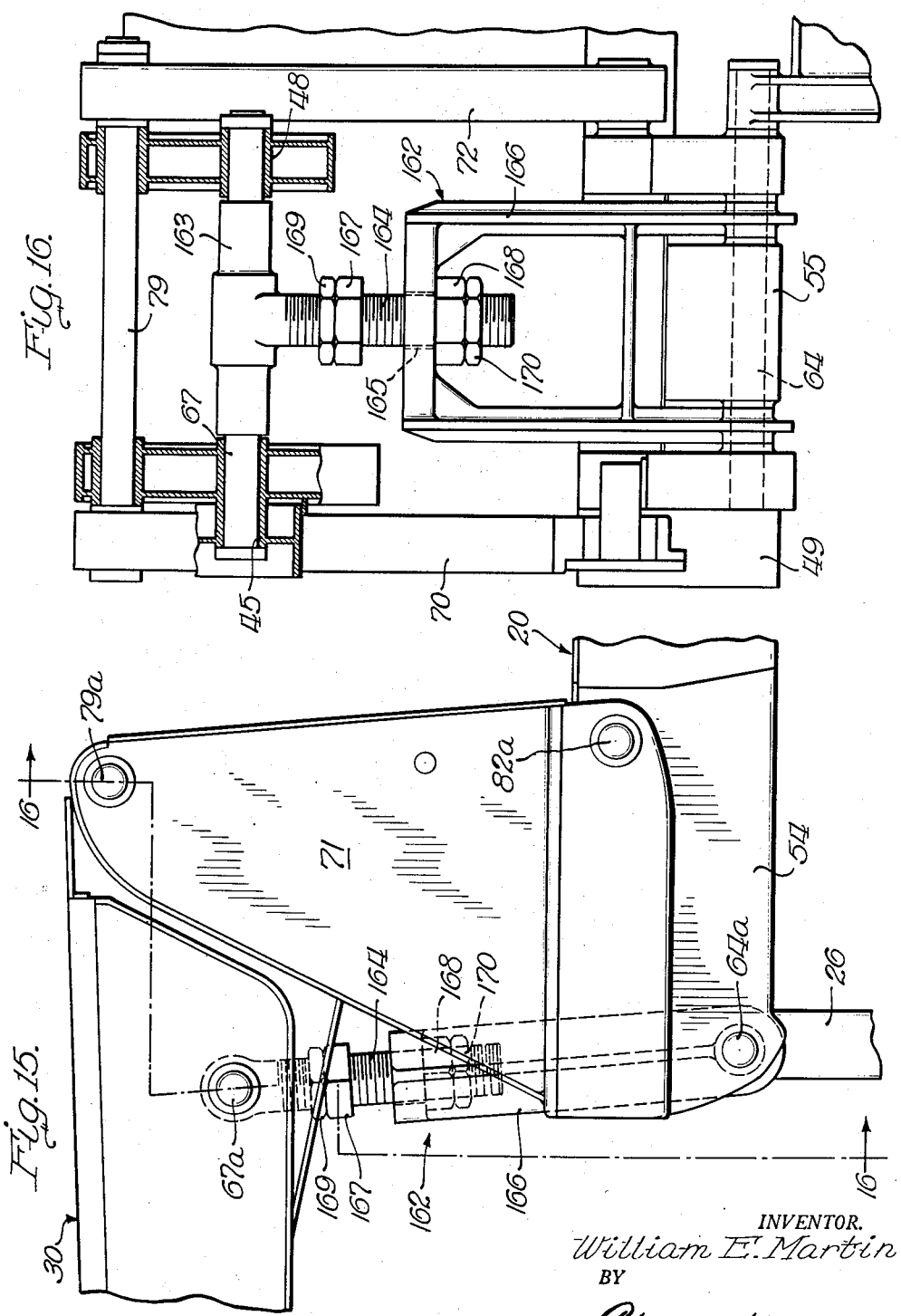

Patented May 18, 1948

2,441,710

UNITED STATES PATENT OFFICE 2,441,710

TRAILER

William E. Martin, Kewanee, Ill.

Application September 21, 1944, Serial No. 555,171

69 Claims. (Cl. 280—33.05)

This invention relates to trailers having relatively low carrying beds that are normally wheel supported at the rear end and provided with a hitching structure in gooseneck form at the forward end adapted for connection with a fifth wheel of a power operated vehicle or to any appropriate draft means.

Trailers of this type may serve many purposes but are chiefly designed for the transportation of heavy machinery or to convey various slow moving vehicles such as excavating machinery, tractors, bulldozers, loading and excavating shovels, etc. Transportation of vehicles of the aforementioned type is costly by reason of the fact that considerable time is required for such transportation under their own power and furthermore considerable fuel is necessary for such travel from place to place. Most of the aforementioned vehicles of present day design are equipped with caterpillar treads that are normally barred from travel on the highways since they obstruct traffic due to their slow movement and that they may also cause injury to certain types of pavement or road surfaces.

The trailer of the construction herein disclosed has the particular improvements of the present invention embodied therein and provides a convenient easy moving conveyance that can be transported over our highways behind a fifth wheel power truck with comparative ease of operation.

Trailers of the new type herein disclosed are all relatively heavy in design due to the fact that they must carry considerable loads upon a single continuous bed of a maximum length to accommodate all the normal vehicles to be carried thereby. Because of the weight of the trailer and the heavy loads which must be carried thereby, the wheel structure comprising a plurality of pneumatic tired wheels is of considerable size forming a relatively large carriage for the rear portion of the bed. The bed itself is disposed in a plane below the carriage framework of the wheels to provide a vehicle carrying level which will allow sufficient vertical clearances above the vehicles that are to be transported upon the trailer so that the entire unit and load may clear viaducts or other structures traversing roadways.

Due to the fact that the vehicle supporting surface of the bed is comparatively low, it is necessary to produce a hitching structure available for connection with the fifth wheel of a tractor vehicle that will extend vertically and preferably one that is in the form of a gooseneck adapted to project upwardly from the bed and outwardly away therefrom carrying a suitable hitching means disposed at proper elevation for contacting the fifth wheel bearing structure of such pulling tractor.

Inasmuch as the structure of the trailer is so underslung, the bed is cradled between the rear wheel carriage assembly and the forward hitching structure whenever such trailer is in transportable condition. Side loading of such a bed is impractical since the maximum width of the bed for normal hauling is limited to insure safe travel along the highway. It is, therefore, one of the main objects of the present invention to provide a hitching structure which can be made to occupy at least two positions relative to the carrying bed vehicle runways of the trailer, such structure acting in one position as a hitching means when elevated into its normal gooseneck form which is the raised transportable position, and which hitching structure in another position can be collapsed so to speak to drop even with or below the loading level of the bed runways for the purpose of permitting access to the bed from the front end of the trailer.

Another object of the invention is to provide a hitching structure of the type described in the foregoing paragraph comprising an articulated unit substantially of the same width as the bed per se and wherein the articulated sections are covered with suitable decking or planking to furnish a continuous runway extending to the loading level of the bed from the trailer supporting roadway to permit direct loading of vehicles onto the bed under their own power.

Another object of this invention is to provide a retractible supporting gear comprising a suitable foot installed adjacent the forward section of the bed to support the latter at a predetermined level and to permit the hitching structure to move from one of its main positions to the other position and to facilitate loading the bed of the trailer while the hitching structure is disposed in its lowered relation with respect to the bed while acting in the capacity of a loading ramp. The supporting foot for the front end of the trailer is retractable and can be raised to the underside of the load carrying bed after the hitching structure has been connected with the fifth wheel of a pulling vehicle which places the trailer in transportable condition.

The trailer further embodies the use of cooperative power operated mechanisms for raising the hitching structure from one position to the other together with suitable latching mechanism to automatically lock the gooseneck into raised operative hitching position. The hitching structure is lowered by gravity under the control of said power mechanisms.

The trailer is also provided with power operated mechanism to lower the supporting foot into its ground engaging relation with respect to the trailer bed. Cooperative mechanisms are employed for retracting the foot and raising the same out of road engaging position upon release of the power operated means. This is normally done at the time when the hitch is connected with the fifth wheel of a pulling tractor which ordinarily raises the front end of the bed above its normal loading plane raising the foot off of the roadway.

All other objects and advantages embodied in the preferred and modified constructions of trailer herein disclosed shall hereinafter be referred to in the following detailed description having reference to the accompanying drawings:

In the drawings:

Fig. 1 is a side elevational view of a trailer embodying the principles of the present invention, such trailer being illustrated in loaded position and ready for attachment with an appropriate draft connection of a power vehicle;

Fig. 2 is a side elevational view of the trailer with the parts thereof disposed in position for loading or unloading the trailer;

Fig. 3 is an enlarged fragmentary view of the forward portion of the trailer with the parts thereof in the same position illustrated in Fig 1;

Fig. 4 is a side elevational view of a fragmentary portion of the reverse side of the trailer hitch shown in Fig. 3 to illustrate certain details of construction thereof;

Fig. 5 is a perspective view of the cooperative latching elements utilized for maintaining the hitching structure in raised relation to the bed of the trailer with the elements in unlatched relation;

Fig. 6 is a plan view of the forward hitch and ramp portion of the trailer with certain parts thereof broken away and with the decking removed from the latticed framework of the bed of the trailer to illustrate structural details thereof;

Fig. 7 is the front elevational view of the trailer with the parts in the same positions illustrated in Figs. 1 and 3 but with certain parts thereof broken away and in section to clarify some of the structural details of the working parts of the combined hitch and ramp unit;

Fig. 8 is a longitudinal cross sectional view through the forward hitching end of the trailer as taken substantially along the line 8—8 in Fig. 7;

Fig. 9 is an enlarged detailed view of a fragmentary portion of the hitching structure to illustrate cooperative abutment members utilized in the successful operation of the hitch means;

Fig. 10 is a longitudinal cross sectional view of the forward end of the trailer bed to show a changed position of the bed supporting means as retracted for transportation of the trailer;

Fig. 13 is an enlarged fragmentary side elevational view of the upright portion of the gooseneck of the trailer illustrating a modified construction of the operating link mechanism;

Fig. 14 is a cross sectional view of such modified link construction as taken substantially along the line 14—14 in Fig. 13;

Fig. 15 is an enlarged fragmentary side elevational view similar to Fig. 13 but illustrating another modified operating link mechanism incorporated into the gooseneck hitching structure; and Fig. 16 is a cross sectional view taken substantially along the line 16—16 in Fig. 15 to further illustrate certain details of the modified link construction.

Figure 11:
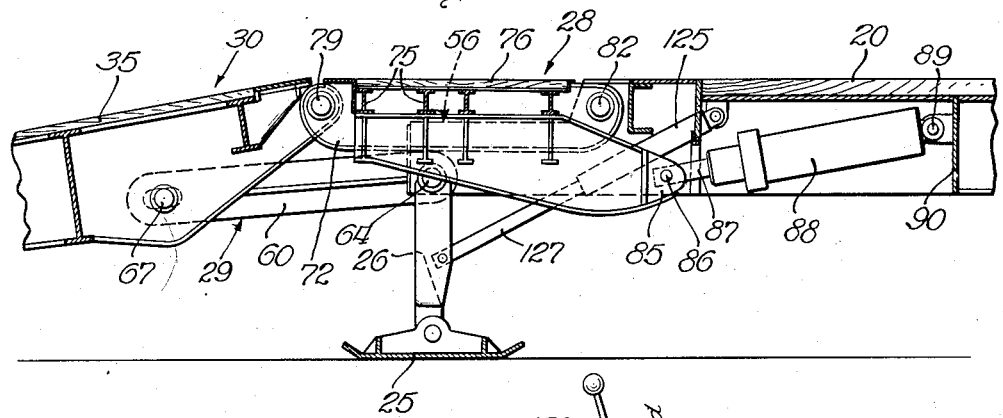
Fig. 11 is a longitudinal cross sectional view corresponding to that shown in Fig. 8 with the parts thereof lowered and in trailer loading position.

The trailer as completely illustrated in Fig. 1 comprises a carrying bed 20 connected at its rear end with the framework of an overhanging carriage 21, the latter being suspended upon appropriate spring units 22 supported upon the pneumatic tired wheels 23 and 24. The forward portion of the bed 20 is maintained at a predetermined elevation above the roadway by suitable supporting means which in this trailer construction includes a foot 25 connected with a suitable leg structure 26 providing a retractible landing gear which may be pulled up and disposed in transportable relation against the under side of the bed 20.

The forward end of the bed 20 is further provided with the gooseneck hitching structure generally indicated at 27 chiefly consisting of the articulated members 28, 29 and 30 adapted for positioning a hitch pin 31 in the predetermined relation with respect to the roadway to be connected with the fifth wheel assembly of a towing vehicle. Attention is directed to the fact that member 30 of the gooseneck 27 provides a loading ramp as best illustrated in Fig. 2 wherein the hitching structure has been lowered to the roadway as shown to provide a continuous runway including members 30 and 28 disposed in contiguous relationship with the upper surface of the bed 20 thereby establishing a loading runway for sustaining the passage of a unit or units which are to be conveyed by the trailer.

With the parts of the carrying trailer disposed in the positions shown in Fig. 1, the upright member 28 of the gooseneck together with the raised structural frame portion of the carriage 21 together with the bed provide a cradle for confining and supporting loaded vehicles upon the trailer. Furthermore, suitable lashing rings 32 are secured to the side of the bed in selected positions therealong for anchoring loaded machinery or vehicles upon the bed 20. The bed sides are also provided with conveniently placed sockets 33 for the reception of vertical timbers or other upright members to support side boards or guides which can project upwardly above the loading level of the deck or bed 20. In this connection it is also contemplated to provide similar means that may be used to removably support centrally raised dividers for machinery or vehicle guiding means along the length of the bed. This principle of using bed dividers or guides may be carried to the members 28 and 30 of the gooseneck 27 should that be desired under conditions where loading certain types of equipment may be expedited with such additions.

As referred to hereinbefore, the member 30 of the trailer gooseneck functions in a capacity of a hitching unit when raised as in Fig. 1 and also acts in the dual capacity of providing a ramp for loading the trailer when lowered to the roadway. The exact structural details of the ramp member 30 are not important inasmuch as numerous structural designs may be utilized in the manufacturing of this unit. However, in the present construction a plurality of I-beams, steel plates and the like have been cut to form and appropriately welded together to produce a hollow bodied ramp 34, Fig. 8, of latticed framework which terminates in a common level for supporting planking 35 to provide a deck and runway for whatever mechanisms may be loaded upon the trailer bed 20. The forward end of the ramp framework 34 terminates in a tapered nose 36 to provide a better approach to the forward portion of the ramp and a pair of ground engaging projections or feet 37 are connected in laterally spaced relation adjacent the underside of the nose 36 to protect the forward end of the ramp and to maintain the hitch pin 31 out of engagement with the roadway under normal loading conditions.

The rear portion of the ramp 30 terminates in a plurality of arm structures providing means for carrying suitable bearings to pivotally connect the ramp with the members 28 and 29 in the manner best illustrated in Figs. 7 and 8. The ramp is generally symmetrical in construction and as shown in Figs. 3 and 7, the extreme outer sides 40 and 40a of the ramp terminate short of the upright members 28 as shown at 41 and 41a, with lateral offset arms 42 and 42a continuing in lateral spaced relation with respect to the members 28 to support bearings 43 and to provide abutment pieces 44 and 44a. Both of the side structures 40—40a and the continuing arms 42—42a support common bearings 45 as best shown in Fig. 7. Other structural members longitudinally disposed with respect to the ramp terminate in arms 46 and 46a carrying spaced bearings 47 and 48 in transverse alignment with the bearings 43 and 45.

Referring now to Figs. 6 and 7, the forward end of the bed is provided with an auxiliary framework 49 having bearing supporting frames 50 and 51. The bed end of the frames 50 and 51 each carries aligned bearings 52 and 53 at one level with respect to the bed, while the forward end of each of the supporting frames is provided with parallel projections 54, 55, 56, and 54a, 55a and 56a respectively, to support bearings such as 57, 58 and 59 in aligned relation at a lower level with respect to the bed 20.

The articulated members 29 previously described comprise a pair of built up links 60 and 61 that are identical in construction. Link 60, Fig. 7, terminates at its lower end with a pair of bearings 62 and 63 carried to straddle the projection 55 of the bearing supporting frame 50 and to be pivotally carried upon a cross shaft 64 that extends through the bearings 57, 58 and 59 in the projections of the auxiliary frame 50. The upper side portions of each of the links 60 and 61 are provided with a pair of elongated openings 65 and 66 traversed by a shaft 67 that also extends through the aligned bearings 45 and 48 in the ramp arms 42 and 46.

From the foregoing description it is to be noted that the links 60 and 61 provide a means for pivotally supporting and for connection with the ramp 30 at one point intermediate the length thereof and from the forward end of the bed through the instrumentality of the auxiliary frame 49. Furthermore, a lost motion connection is provided between the upper ends of the links 60 and 61 with the shafts 67 and 67a that are carried in aligned relation at opposite sides of the ramp structure 30.

Referring now to Figs. 3, 7 and 8, the second articulated vertical member 28 of the gooseneck as shown and briefly described previously comprises an additional link mechanism for cooperating with the above explained link units 60 and 61 and acts to provide a second means for pivotally supporting and connecting with the ramp structure 30 at another point at the rear end thereof and is adapted to rock about another pivotal center adjacent to the forward end of the bed 20. This second link structure designated generally by 28 is also built up of a plurality of structural members suitably welded together to form a bridging means to carry an intermediate deck or runway to establish a contiguous vehicle supporting runway between the ramp and the bed proper when such link structure is disposed with the ramp in lowered position as illustrated in Fig. 2.

This intermediate runway link unit 28 of the gooseneck is made up of two lateral or outer frames 70 and 71, a pair of intermediate links 72 and 73, and a centrally disposed operating arm 74 that are all connected by suitably placed I-beams 75 traversing the structure and providing a common supporting level upon which the decking 76 for the runway can be mounted. The outer side frames 70 and 71 each carries an upper bearing 77 in alignment with the bearings 78 carried by the intermediate frames 72 and 73. The bearings 43, 47 and 77, 78 are traversed by common shafts 79 and 79a as best shown in Figs. 3 and 7 to complete the pivotal connection between the upper ends of the bed member 28 and the adjacent end of the ramp 30.

Each of the side frames 70 and 71 is also provided with lower bearings 80 and 80a disposed in alignment with bearings 81 and 81a carried by the lower ends of the frames 72 and 73. Shafts such as 82 and 82a traverse the bearings 80—81 and 80a—81a and also the bearings 52 and 53 carried by each of the frame projections 50 and 51 of the auxiliary frame 49. This completes another pivotally mounted structure supported from the forward end of the bed and working in cooperative relation with respect to the links 60 and 61. Attention is here directed to the fact that in the preferred construction illustrated and as best shown in Figs. 3 and 8 that the axial centers of the shafts 64, 67, 79, and 82 have been so located as to provide a parallelogram wherein the pivotal centers of such shafts are on the four corners of the parallelogram. This is true whenever the hitching structure is in the raised or elevated position as shown in Figs. 1, 3, and 8 or in the lowered position shown in Fig. 2.

Referring to Figs. 6, 7, and 8 it is seen that the central arm 74 of the intermediate deck link structure is heavily reinforced by I-beams as shown in Fig. 8 and is provided with a depending arm portion 85 providing a pivotal point 86 for connection with a piston of a hydraulically operated power cylinder 88 which is pivotally secured at 89 to the welded latticed framework structure 90 of the bed 20. As best shown in Fig. 8, the admission of a fluid under pressure to the cylinder 88 causes piston 87 to be urged outwardly therefrom revolving the entire intermediate deck unit 28 and link mechanism in a clockwise direction to raise the rear pivotal portion of the ramp 30 through an arc described by the axial center of shaft 79 about the pivotal axis of the shaft 82. During this action the forwardly disposed free acting links 60 and 61 will serve to bring the entire ramp approximately into the position illustrated in Figs. 1 and 8. Links 60 and 61 will act to guide the entire ramp during the greater portion of the raising action thereof so long as the shafts 67 and 67a remain resting in the lower end portions 91 of the elongated slots 65 and 66. After the abutment means 44 and 44a of the arms 42 and 42a of the ramp come to a position wherein the pads 92 engage the pads 93 supported upon the beams 75, members 28 and 30 will then move in clockwise direction as an entire unit raising the shafts 67 and 67a longitudinally of the slots 65—66 in the links 60 and 61 until such shafts engage the upper end portions of the slots stopping the clockwise movement of the entire structure in the full up position shown in Fig. 8.

It is obvious that the power cylinder could be maintained in the relation shown in Fig. 8 with the piston 87 fully extended under pressure and acting to hold the entire hitching structure in raised position as illustrated. This may be desirable in certain cases but is deemed more practical and feasible in most instances to provide independent means for maintaining and holding the structural hitching unit in its raised position without the continued use of the cylinder 88 under fluid pressure for accomplishing this purpose. Any suitable latching arrangement or stop mechanism can be utilized for locking the gooseneck structure and its connected parts in elevated position. One such arrangement has been illustrated in Figs. 3, 4, 5, and 7 wherein the side frames 70 and 71 are constructed with suitable guideways 95 and 96 respectively for slideably supporting blocks 97 and 98 therein. These blocks 97 and 98 are provided with laterally projecting latches 99 and 100 having relatively large flat under surfaces 101 and 102 respectively as shown.

When the slide blocks 97 and 98 are retracted as indicated in Figs. 3 and 4 and disposed in a position with the outer end faces of the latches substantially coincident with the forward ends of the side frames 70 and 71, the lower surfaces 101 and 102 will then be disposed in contacting engagement with the upper surfaces 103 and 104 respectively of the outer projections 54 of the auxiliary frame structures 50 and 51. Thus, the latches 99 and 100 connected with the slide blocks 97 and 98 respectively and carried in the guideways of the side frames 70 and 71 at a distance considerably forwardly with respect to the pivotal shafts 82—82a provide a structure wherein the latches normally function as a supporting means for the triangularly shaped side frames 70 and 71 to hold the latter upon the upper portion of the frame pieces of the auxiliary frame 49. This support by the latches will be transmitted through the abutment members 92 and 93 to the ramp section of the gooseneck so that the overhanging weight of the latter is actually supported through the latch members upon the solid top portions of the outer frame projections described.

The latches and their respective slide blocks are normally maintained in their retracted latching position through suitable springs 105 connected to a fixed portion of the side frame members 70 and 71, respectively, and also connected to suitable link mechanisms 106 and 107 mounted in such side frame members. The link 108 in Fig. 4 is extended as illustrated and provided with a projecting handle 109 which operates in an arcuate slot 110 in the frame member 70 disposed concentrically with respect to the pivotal bearing 111 of the link arm 108. The ends of the slot 110 determine the limit of operation of the handle 109 from latched position as shown in Fig. 4 to the unlatched position which is at the other end of the slot. The actions of the link mechanisms 106 and 107 are synchronized by means of a cross shaft 112 carrying connecting link arms 113 and 114 which are joined at opposite sides of the trailer to the link mechanisms 106 and 107 as shown in Figs. 3 and 4.

By moving the handle 109 to the left as shown in Fig. 4, both of the latch units comprising the blocks 97 and 98 will be moved to the right and outwardly beyond the ends of the side frames 70 and 71 into a position where the latches 99 and 100 will overhang the projecting portions 54 of the frames 50 and 51. Thus the latch members will be moved outwardly out of contact with the respective frame pieces and the ramp and intermediate gooseneck supporting link mechanisms will then be freed and able to descend into the position illustrated in Fig. 2 for loading and unloading the trailer. It is to be noted from Figs. 3, 4 and 5 that the forward end portions of the projections 54 are rounded substantially as shown at 115 and 116 to be contacted by the edges 117 and 118 of the latch units to hold the same in the outwardly released position without necessitating holding the handle 109 after the gooseneck unit has begun to drop forwardly with respect to the trailer. As the ramp is again raised thereafter the contacting edges 117 and 118 of the latches will continue to slide along the forward edges 115 and 116 of the frame projections 54 until the hitching structure is brought into its full elevated position and at that instant both of the latches will again snap back under the action of the springs 105 with the bottom surfaces 101 and 102 thereof in direct engagement with the corresponding upper surfaces 103 and 104 of the frame projections 54 relocking the entire operative framework in raised position.

The supporting means hereinbefore referred to as the retractible landing gear mechanism comprises legs 26 and a connected foot 25, best shown in Figs. 3, 7, 8, and 10. The legs 26 of the supporting foot of the trailer are conveniently produced by welded structural sections and are connected by a cross-brace 120 and provided at their upper ends with a pair of bearings 121 and 122 for pivotal connection with the aligned separated shafts 64 and 64a supported as described at the forward ends of the auxiliary framework 49 of the trailer bed 20. The foot 25 is pivotally connected to the pins 123 and 124 of the legs 26 and is freely pivoted for normal horizontal suspension through this pendulum form of connection of the foot with the legs 26.

A pair of hydraulically operated cylinders 125 and 126 shown in Figs. 6, 8, 10, and 11 are mounted for pivotal movement relative to the bed 20 of the trailer and are connected by means of the pistons 127 and 128 to pivot studs 129 and 130 carried by the legs 26 as best shown in Figs. 3, 4, and 7. By applying fluid under pressure to the cylinders 125 and 126 the legs are pivotally moved downwardly into the positions indicated in Figs. 3 and 8, such position normally being determined by the length of the piston stroke of the cylinders. It is obvious that double acting cylinders may be provided for returning the legs to the raised inoperative position as illustrated in Fig. 10. However, as shown in Figs. 3, 6 and 7, the trailer here employs a pair of cables 131 and 132, that can be connected to the pivot pins 123 and 124 respectively. These cables are connected with suitable springs 134 and 135 operatively housed and guided in protective tubings 136 and 137 supported by the bed framework. The springs 134 and 135 having their rearward ends suitably secured to the tubing or to the framework of the bed as the case may be. In order to change the running direction of the cables 131 and 132 suitable sleeve members such as shown at 139 in Fig. 3 may be employed, it being also possible to provide sheaves or other mechanical means for accomplishing the same purpose. Under the action of the springs 134 and 135 it is possible to cause retraction of the supporting mechanism or landing gear into an inoperative position substantially as illustrated in Fig. 10. Other mechanism may be employed for retracting the gear from the means that has just been described.

It is obvious that the raising of the structural units comprising the ramp and the connected link mechanism for placing the entire trailer into a hitching position may be accomplished by the use of various types of mechanism either manually operated or power operated. In the present construction the entire operation of the trailer parts is controlled hydraulically by means of a hand manipulated power pump 140 of a type illustrated in Figs. 4 and 6 which is conveniently mounted upon the bed structure of the trailer. The hydraulic system and its operation may be better understood with reference to Fig. 12. It is here seen that the power pump 140 is connected through a valve 141 in the pipe line 142 leading to the cylinders 125 and 126 which operate the landing gear. The pump 140 is connected through a valve 143 in the pipe line 144 to the main ramp operating cylinder that is employed for raising the articulated gooseneck structure. Another valve unit 145 is connected with the pump 140 and is operated by a hand lever or other valve handle 146 adapted as a shut-off valve for manipulating suitable by-passes to permit the hydraulic fluid to selectively return from either one of the pipe lines 142 or 144 through the pump back to the common pipe line 147 and into the reservoir or tank 148. When handle 146 is straight up no fluid can be bled from either operating side of the pump 140. Moving handle 146 to the right Fig. 12 permits fluid to pass from cylinder 88 to the reservoir. Moving same to the left will permit fluid to bleed from cylinders 125 and 126 to the reservoir.

Figure 12:
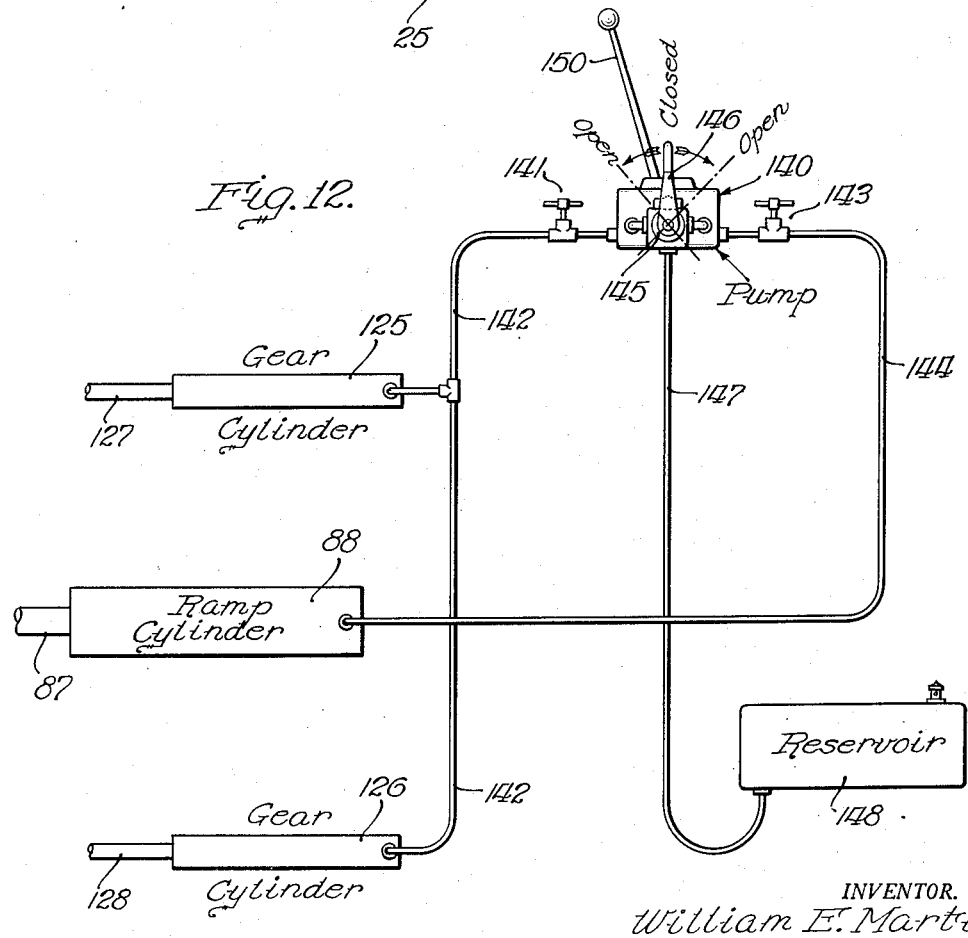
Fig. 12 is a diagrammatic illustration of the hydraulic system employed for raising the hitching structure and also for lowering the bed supporting gear means of the trailer.

With reference to Figs. 3, 4, and 12, the operation of the trailer is normally carried out in the following manner. Assuming the trailer has been drawn by a power operated vehicle for transporting certain equipment upon such trailer bed, the first step after stopping for unloading is to shut off the valves 143 and 145 and thereafter open the valve 141. Then by manually operating the pump lever 150 in a back and forth motion, hydraulic fluid can be pumped into the pipe line 142 to the cylinders 125 and 126 to lower the landing gear foot into the position shown in Figs. 1 and 3 for supporting the forward end of the bed. The power operated vehicle can then be detached from the hitch pin 31 and moved away from the trailer whereby the foot 25 will then engage the ground to furnish a support to the forward end of the bed 20.

The ramp may now be lowered with valve 145 closed by opening valve 143 permitting fluid to by-pass from the cylinder 88 through the adjacent side of the pump into the pipe line 147 and back to the reservoir 148. This causes the ramp to slowly descend into its ground engaging position forcing the hydraulic fluid out of the cylinder 88 which automatically acts as a snubbing means to retard the rate of downward movement of the structural hitch unit. The ramp will not lower until handle 109 has first been operated to release the pair of latches which normally maintain the hitch structure in its raised position. The trailer parts will now be disposed in a position best illustrated in Figs. 2 and 11 permitting a loading or unloading of the trailer as the case may be.

The downward movement of the ramp and continued movement of the link structure 28 and 29 may be stopped by closing valve 143 to stop the flow of fluid from cylinder 88. Under most operative conditions the full down position is obtained when the cross beams 75 (see Fig. 11) engage the top sides of the bearing projections 54—56 and 54a—56a with the ramp free to seek its own operating level due to its lost motion connection with links 60 and 61. The parts as portrayed in Fig. 11 are shown in a position immediately prior to the full down position and as being held by the piston 87 under fluid pressure.

In order to again raise the ramp into its hitching position with respect to the trailer bed, valve 145 is closed and the lever 150 of the pump 140 is operated until the cylinder 88 raises the ramp into the position originally indicated in Figs. 1 and 3, or until the latches re-engage the frame for locking and holding the hitching structure in this position. Thereafter, the truck or power vehicle may again be attached to the hitch pin in a known manner for drawing the trailer to a desired destination. After the hitch coupling is completed the foot of the landing gear is then again lifted off the ground due to the fact that the normal hitched position of the trailer with pulling vehicles will raise the forward end of the bed 20. The landing gear can then be retracted by opening the valve 141 and moving valve 145 to the left in Fig. 12 thereby permitting the fluid to bleed out of the cylinders 125 and 126 back into the reservoir 148 through the pipe line 147. The particular details of the pump 140 have not been illustrated in view of the fact that this structure is of a known design and has been adapted to serve the purpose for operating the moving parts of the trailer herein disclosed.

As hereinbefore mentioned in connection with the preferred construction of the trailer, the shafts 64, 67, 79 and 82 are disposed in parallelogrammatic relationship and include the lost motion connection at the upper ends of the links 60 and 61 with the ramp 30. This provides a means whereby the forward end of the ramp will drop quicker than the rearward end thereof to meet the ground at an angle to the loading plane of the bed. There are other ways in which the ramp may be supported which need not necessarily involve a parallelogram arrangement of the link mechanism in the manner portrayed in the preferred construction. However, there are also other ways in which the lost motion action may be acquired from the action illustrated in the preferred construction of Figs. 3 and 8.

One such modified construction is illustrated in Figs. 13 and 14 wherein an extensible link 151 has been interposed between the shafts 64 and 67. Such extensible link comprises a first section having a bearing 152 and a stud 153 depending therefrom. A second section 154 in the form of a bracket straddles the frame projection 55 and terminates with bearings 156 and 157 rockably mounted upon the shaft 64. This bracket 154 is provided with a tubular standard 158 which slidably receives the stub shaft 153 therein. A crosspin 159 is secured to the shaft 153 and operates within a pair of slots 160 and 161 formed in the walls of the tubular standard 158.

With the foregoing described construction no lost motion takes place adjacent any of the shafts providing the pivotal mountings of the hitching structure. In this case the connecting links 151 are extensible and contractible to produce the same action as obtained in the foregoing preferred structure to permit lowering of the nose end of the ramp when the latter is brought into engagement with the ground.

Another modified arrangement of lost motion mechanism is portrayed in Figs. 15 and 16. In this particular structure it is possible to obtain adjustment between the relatively moving parts which together form the lost motion means for providing a diminution of the distance between the shafts 64 and 67. This modified arrangement of elements teaches the use of a two section link 162 connected between the shafts 64 and 67. One section of the link is provided with a bearing 163 journaled upon the shaft 67 and provided with a depending threaded screw 164 that projects through an opening 165 disposed in the upper end of a bracket 166 of a second section as best illustrated in Fig. 16. With this construction the relative movement of the shafts 64 and 67 toward and away from each other is limited and adjustable by means of the nuts 167 and 168 each respectively locked in place by the adjacent lock nuts 169 and 170. Therefore, with the latter construction a link means is provided wherein the amount of lost motion between the ramp and the linkage mechanism is capable of adjustment and wherein the angularity of the normally raised position of the ramp may also be regulated if desired.

Other modifications and variations in the above construction of trailer having the workable elements described are contemplated. It is to be understood therefore that changes in the exact form, construction, or combination of parts may be made without departing from the fundamental concept of the invention. Such changes and variations shall be governed however by the definition of the invention as set forth and described in the following appended claims.

What I claim is:

1. In a trailer, the combination of a carrying bed, a structure connected with said bed to provide a hitch when disposed in one position relative to said bed, said structure constituting a ramp approach to the bed when disposed in another position with respect to said bed, and operative mechanism forming a part of the trailer to actuate the ramp from one to the other of said positions.

2. In a trailer, the combination of carrying bed, a structure connected with said bed to provide a hitch when disposed in one position relative to said bed, said structure functioning as a ramp approach to the bed when disposed in another position with respect to said bed, power operated mechanism connected with said structure to actuate the latter from one to the other of said positions, retractible foot means to support said bed adjacent said structure while the latter is actuated into either one of its positions, and cooperative means for moving said foot means into bed supporting position and to retract the foot means respectively.

3. In a trailer, the combination of a loading body, a structure connected with said body to provide a hitch when disposed in one position relative thereto, said structure constituting a ramp approach to said body when disposed in another position with respect thereto, and operable supporting means constituting a part of said trailer and serving to support said body adjacent said structure while the latter is disposed in either of its positions or during the actuation of such structure between said two positions.

4. In a trailer, the combination of a carrying bed, a structure connected with said bed to provide a hitch when disposed in one position relative to said bed, said structure functioning as a ramp approach to the bed when disposed in another position with respect to said bed, power operated mechanism connected with said structure to actuate the latter from one to the other of said positions, and releasable latch means to lock and hold said structure when moved into one of its aforesaid positions.

5. In a trailer, the combination of a load carrying bed, supporting wheels for one end thereof, pedestal means connected to said bed and serving to support the second end thereof, and a structural unit connected with one end of said bed extending across the same from side to side and movable relative thereto, said structural unit comprising a hitch when disposed in one position relative to said bed and comprising a ramp to approach said bed when disposed in another position with respect to said bed.

6. In a trailer, the combination of a load carrying bed of maximum permissible width for highway transportation, a wheel carriage connected at one end with said bed to support the latter, the overall width of said wheels and carriage being substantially equal to or less than said bed width, and hitch means connected with the other end of said bed and movable into road engaging position with respect to said bed, said hitch means providing a ramp of bed width for approach to the latter when in said road engaging position, and retractible bed supporting means adjacent the hitch means to maintain the bed and hitch means in operative loading relationship and to facilitate hitching operations.

7. A gooseneck hitch for a trailer bed and for connection with a fifth wheel of a vehicle comprising articulated sections forming the vertical and horizontal extending portions of said hitch, one of said sections carrying the hitch pin for said fifth wheel, and operative means for moving said articulated sections from hitching position into a position in contact with the trailer supporting surface to form a continuation of the trailer bed and a loading runway thereto.

8. A gooseneck hitch for a trailer bed adapted for connection with the fifth wheel of a vehicle, comprising articulated sections forming the vertical and horizontally extending portion of said hitch, one of said sections carrying the hitch pin for said fifth wheel, and operable means for moving said sections substantially into a continuous runway between the end of the bed and the trailer supporting surface, said sections being lined with decking to form a loading runway to said bed.

9. A gooseneck hitch for a trailer bed adapted for connection with the fifth wheel of a vehicle, comprising articulated sections forming the vertical and horizontally extending portions of said hitch, one of said sections carrying the hitch pin for said fifth wheel, and operable means for moving said sections substantially into continuous alignment respectively between the end of the bed and the trailer supporting surface, said sections being lined with decking to form a loading runway to said bed, and supporting means for said bed disposed adjacent the connected articulated sections of said hitch to hold the bed and runway in operative loading relation.

10. In a trailer, a hitch disposed in raised and vertically spaced relation with respect to the bed of the trailer, link mechanism pivotally mounted on said bed and connected to support said hitch in said raised relation to the bed, and actuating means connected with said link mechanism to permit lowering of said hitch to a position continuous with and below the general plane of said bed, said actuating means being adapted to again lift said hitch to its original raised relation above the bed.

11. In a trailer, a hitch mechanism disposed above the general plane of the trailer loading bed, link mechanism mounted on said bed and connected with the hitch mechanism to support the latter, latch means coacting between the bed and one of said mechanisms to hold said hitch mechanism in operative raised relation above the bed, release of said latch means permitting lowering of said hitch mechanism through said link mechanism, and power operated means connected with one of said mechanisms to snub the lowering of said hitch mechanism and adapted to again raise said mechanism into its original latched position when so operated.

12. In a trailer, a hitch mechanism disposed above the general plane of the trailer loading bed, link mechanism mounted on said bed and connected with the hitch mechanism to support the latter, latch means coacting between the bed and one of said mechanisms to hold said hitch mechanism in operative raised relation above the bed, release of said latch means permitting lowering of said hitch mechanism through said link mechanism, power operated means connected with one of said mechanisms to snub the lowering of said hitch mechanism and to raise said mechanism into its original latched position when so operated, said hitch mechanism including a deck to provide a runway, and said link mechanism having a deck to bridge the space between said trailer bed and hitch mechanism runway whereby both decks comprise a continuous runway to said bed when said hitch mechanism has been lowered.

13. In a trailer, a loading bed, a ramp providing a runway to said bed when disposed in loading position, parallel link mechanism to move the ramp from loading position to raised inoperative traveling position, and a hitch member connected with said ramp for connection with a traction vehicle for drawing said trailer.

14. In a trailer, a loading bed, a ramp connected with said bed and having a hitch member for attachment with a traction vehicle to draw said trailer, parallel link mechanism pivotally mounted upon said trailer and pivotally connected with said ramp to support the latter in a position substantially parallel to the loading bed, abutment members on said ramp and said parallel link mechanism to prevent relative movement of the ramp with respect to the link mechanism and to hold said ramp suspended in its parallel position to said bed, and releasable latch means for locking said parallel link mechanism against movement relative to the bed and, also, to hold the ramp raised through said cooperative abutment members.

15. In a trailer, a loading bed, a ramp connected with said bed and having a hitch member for attachment with a traction vehicle to draw said trailer, parallel link mechanism pivotally mounted upon said trailer and pivotally connected with said ramp to support the latter in a position substantially parallel to the loading bed, abutment members on said ramp and said parallel link mechanism to prevent relative movement of the ramp with respect to the link mechanism to hold said ramp suspended in its parallel position to said bed, and releasable latch means for locking said parallel link mechanism against movement relative to the bed and, also, to hold the ramp raised through the cooperative abutment members, certain of the links in said parallel link mechanism having lost motion connection with said ramp whereby the latter is moved out of its parallel position with respect to the bed upon relative movement of the ramp and said link mechanism, and power lift means acting upon said link mechanism to permit such relative movement between said ramp and the link mechanism to cause said ramp to contact the roadway at an angle to the bed, said power lift means being adapted to restore said ramp and link mechanism to raised traveling position when again operated.

16. In a trailer, the combination of a carrying body, a gooseneck hitch movably connected with said body and adapted for coupling with a towing vehicle, said gooseneck being normally disposed above the loading level of said body when in transportable position, and operable mechanism connected between said body and said gooseneck to permit the latter to move into ground engaging position, said operable mechanism providing means to raise said gooseneck into hitching position.

17. In a trailer, the combination of a carrying body, a gooseneck hitch pivotally connected with said body and adapted for coupling with a towing vehicle, said gooseneck comprising articulated members normally disposed above the loading level of said body when in transportable position, and power mechanism connected between said body and said gooseneck members to permit the latter to move into ground engaging position, said power mechanism providing means to raise the gooseneck members into hitch position.

18. In a trailer, the combination of a carrying body, a gooseneck hitch pivotally connected with said body and adapted for coupling with a towing vehicle, said gooseneck comprising articulated members normally disposed above the loading level of said body when in transportable position, and power mechanism connected between said body and said gooseneck members to permit the latter to move into ground engaging position, said power mechanism providing means to raise the gooseneck members into hitching position, said articulated gooseneck members having cooperative means coacting therebetween to fix said members in a predetermined hitching relation with respect to each other.

19. In a trailer, the combination of a carrying body, a gooseneck hitch pivotally connected with said body and adapted for coupling with a towing vehicle, said gooseneck comprising articulated members normally disposed above the loading level of said body when in transportable position, and power mechanism connected between said body and said gooseneck members to permit the latter to move into ground engaging position, said power mechanism providing means to raise the gooseneck members into hitching position, said articulated gooseneck members having cooperative means coacting therebetween to fix said members in a predetermined hitching relation with respect to each other, and latch means for locking said gooseneck relative to said carrying body.

20. In a trailer, the combination of a carrying bed, a structure connected with said bed to provide a hitch when disposed in one position relative to said bed, said structure functioning as a ramp approach to the bed when disposed in another position with respect to said bed, power operated mechanism connected with said structure to control the movements of the latter from one to the other of said positions, bed support means for maintaining the bed in a predetermined level adjacent said structure while the latter is actuated into either one of its positions, and power means for actuating said bed support means into engagement with the ground.

21. In a trailer, the combination of a carrying bed, a structure connected with said bed to provide a hitch when disposed in one position relative to said bed, said structure functioning as a ramp approach to the bed when disposed in another position with respect to said bed, power operated mechanism connected with said structure to control the movements of the latter from one to the other of said positions, bed support means for maintaining the bed in a predetermined level adjacent said structure while the latter is actuated into either one of its positions, power means for actuating said bed support means into engagement with the ground, and resilient means for retracting said bed support means upon connection of said hitching structure with a towing vehicle.

22. In a trailer, the combination of a loading body, a structure connected with said body to provide a hitch when disposed in one position relative thereto, said structure functioning as a ramp approach to said body when disposed in another position with respect thereto, and a retractible landing gear pivotally connected with said structure and adapted to support the latter in either of its positions or during the actuation thereof between said two positions.

23. In a trailer, the combination of a loading body, a gooseneck pivotally supported from said body to provide a hitch when disposed in one position relative thereto, said gooseneck comprising pivotally connected sections adapted to provide a continuous loading runway to said body when disposed in another position with respect thereto, and a pedestal unit pivotally connected with one of said gooseneck sections and adapted for ground engagement to support the gooseneck during the actuation thereof and while in raised or lowered positions.

24. A gooseneck hitch for a trailer bed and for connection with a towing vehicle comprising articulated sections forming vertical and horizontal extending portions of said hitch, one of said sections having coupling means for connection with said towing vehicle and operative mechanism for moving said articulated sections from towing position into a position in contact with the trailer supporting surface to form a continuous runway from the trailer bed for loading the latter.

25. A gooseneck hitch for a trailer to connect the latter with a towing vehicle comprising connected sections extending upwardly from the loading level of said trailer and outwardly away therefrom, one of said sections having coupling means to connect with said towing vehicle, and operative power means to move said sections from towing position into ground engaging position to form a continuous runway from the ground to the loading level of said trailer.

26. In a trailer, a loading bed, a hitch mechanism for connecting the trailer with a towing vehicle, link mechanism pivotally connected with said bed and said hitch mechanism respectively to provide plural points of support to hold said hitch mechanism in a predetermined position above and outwardly with respect to said bed, stop means coacting with said link mechanism and said hitch mechanism to limit relative movement therebetween in one direction when in towing position and releasable lock means coacting between said bed and one of the aforesaid mechanisms to lock both of the latter against movement in the opposite direction and relative to said bed while said hitch mechanism is in towing position.

27. In a trailer, a loading bed, a ramp connected with said bed and having hitch means for connection with a towing vehicle to draw said trailer, movable link means connected between said trailer and said ramp to support the latter in a position outwardly from the loading bed, and abutment means interposed between said ramp and said link means to prevent relative motion between said ramp and said link means when said ramp hitch means is supported upon a towing vehicle, said link means coacting with said abutment means to prevent relative movement between the ramp and the loading bed while in towing position.

28. In a trailer, a load carrying bed, a hitch structure, spaced link units pivotally connected with said bed and said hitch structure respectively to place said hitch structure in a predetermined position relative to said bed while in towing position, power means to move said link units to displace said hitch structure into a ground engaging position, one of said link units comprising contractible means to permit bodily angular shifting of the hitch structure relative to the bed and ground to provide an inclined runway to said bed.

29. In a trailer, a load carrying bed, hitch means therefor for coupling with a towing vehicle, independent link units pivotally connected with the bed and with said hitch means respectively, said link units being substantially parallel and adapted to place the hitch means in a predetermined relation with respect to the bed while in towing position, operable actuating mechanism to move said links and to displace said hitch means into a ground engaging position, one of said link units comprising relatively movable sections to allow bodily angular shifting of the hitch means about an axis parallel to the bed loading plane to permit said hitch means to contact the ground and to form a loading runway to said bed.

30. In a trailer, a load carrying bed, a hitch structure, spaced link units pivotally connected with said bed and said hitch structure respectively to place said hitch structure in a predetermined position relative to said bed while in towing position, power means to move said link units to displace said hitch structure into a ground engaging position, one of said link units having relatively movable sections to permit limited bodily angular shifting of the hitch structure relative to the bed and the ground to provide an inclined runway to said bed.

31. In a trailer, a load carrying bed, hitch means therefor for coupling with a towing vehicle, independent link units pivotally connected with the bed and with said hitch means respectively, said link units being substantially parallel and adapted to place the hitch means in a predetermined relation with respect to the bed while in towing position, operable actuating mechanism to move said links and to displace said hitch means into a ground engaging position, one of said link units comprising relatively movable sections to allow bodily angular shifting of the hitch means about an axis parallel to the bed loading plane to permit said hitch means to contact the ground and to form a loading runway to said bed, and limit means carried by said one link unit to limit the relative movement between said link sections, said limit means being adjustable to vary the limits of such relative movement of the link sections.

32. In a trailer, the combination of a carrying body, a gooseneck hitch movably connected with said body and adapted for coupling with a towing vehicle, said gooseneck being normally disposed above the loading level of said body when in transportable position, and operable mechanism connected between said body and said gooseneck to permit the latter to move into ground engaging position, said operable mechanism providing means to raise the said gooseneck into hitching position, and control means for said operable mechanism to regulate the operation thereof and to stop said mechanism at or between the limits of movement thereof to support the gooseneck from such stopping point.

33. In a trailer, the combination of a load carrying bed, supporting wheels for one end thereof, pedestal means to support the other end thereof, cooperative means to move said pedestal into bed supporting position and to retract the same therefrom, and a structural unit connected with one end of said bed and movable relative thereto, said structural unit comprising a hitch when disposed in one position relative to said bed and comprising a ramp to approach said bed when disposed in another position with respect to said bed.

34. In a trailer, a load carrying bed, a hitch structure, a link structure pivotally connected with said bed and the hitch structure respectively, operable means connected with one of said structures to cause actuation of the hitch structure between either of its limit positions, namely, ground engaging loading position contiguous with said bed or in raised towing position for draft connection with a power driven vehicle, cooperative means coacting between said structures to determine and stop movement of said hitch structure in said towing position under the action of said operable means, and cooperative means coacting between said bed and one of said structures to determine and stop the movement of said structures when actuated into leading position by said operable means.

35. A trailer structure of the character described, comprising an offset portion joining the main portion of the trailer to a forwardly extending portion adapted to be secured to a towing unit, the said offset portion being swingably connected to the trailer and said forwardly extending portion whereby the latter may be lowered to act as a loading ramp when the towing unit is removed, and rigid connecting means extending in the most direct line between the forwardly extending portion and the trailer for transmitting draft forces to the latter.

36. A trailer structure of the character described, comprising an offset portion joining the main portion of the trailer to a forwardly extending portion adapted to be secured to a towing unit, the said offset portion being swingably connected to the trailer and said forwardly extending portion whereby the latter may be lowered to act as a loading ramp when the towing unit is removed, and connecting means extending between the said forwardly extending portion and the trailer for transmitting draft forces thereto along the most direct path.

37. In a trailer, the combination of a carrying bed, a frame member adjustably connected to one end of the bed for movement into raised and lowered positions, said frame member being constructed to serve as a hitch when in its raised position, and having a width substantially equal to the width of the bed whereby it may serve as a ramp therefor when in lowered position.

38. In a trailer, a loading bed, a ramp providing a runway to said bed when in a lowered position and having a hitch element for attachment with a traction vehicle when in a raised position, and fluid operated means connected to the loading bed for raising and lowering the ramp.

39. In a trailer, a loading bed, a ramp providing a runway to said bed when in a lowered position and having a hitch element for attachment with a traction vehicle when in a raised position, and a fluid operated extensible device anchored at one end to the bed and operatively connected at its other end with the ramp to raise and lower the latter.

40. In a trailer, a loading bed, a structure adjustably connected to the front end of the bed to provide a hitch when in a raised position and to provide a loading ramp when in a lowered position, power operated mechanism connecting the bed and structure to raise and lower the latter, and releasable latch means for locking said structure in one of its said positions.

41. In a trailer, the combination of a carrying bed, a structure connected with said bed to provide a hitch when disposed in one position relative to said bed, said structure functioning as a ramp approach to the bed when disposed in another position with respect to the bed, power operated mechanism connected with said structure to actuate the latter from one to the other of said positions, retractable foot means to support said bed adjacent said structure while the latter is actuated into either one of its positions, and cooperative means for moving said foot means into bed supporting position and to retract the foot means respectively.

42. In a trailer, the combination of a loading body, a structure connected with said body to provide a hitch when disposed in one position relative thereto, said structure being designed and constructed to function as a ramp approach to said body when disposed in another position with respect thereto, and operable supporting means adjustably connected to the body to support the latter adjacent said structure while the latter is disposed in either of its positions or during actuation of such structure between said two positions.

43. In a trailer, the combination of a load carrying bed of maximum width for highway transportation and adapted to be supported at its rear by road engaging wheels, and hitch means connected with the other end of said bed and movable into road engaging position with respect to said bed, said hitch means providing a ramp of bed width for approach to the latter when in said road engaging position, and retractible bed supporting means adjacent the hitch means to maintain the bed and hitch means in operative loading relationship and to facilitate hitching operations.

44. A gooseneck hitch for a trailer bed and for connection with a fifth wheel of a vehicle comprising articulated sections forming the upright and horizontal extending portion of said hitch, one of said sections carrying the hitch pin for said fifth wheel, and operative means for moving said articulated sections from hitching position into a position in contact with the trailer supporting surface to form a continuation of the trailer bed and a loading runway thereto.

45. A gooseneck hitch for a trailer bed adapted for connection with the fifth wheel of a vehicle, comprising articulated sections forming the upright and horizontally extending portion of said hitch, one of said sections carrying the hitch pin for said fifth wheel, and operable means for moving said sections substantially into a continuous runway between the end of the bed and the trailer supporting surface, said sections being lined with decking to form a loading runway to said bed.

46. A gooseneck hitch for a trailer bed adapted for connection with the fifth wheel of a vehicle, comprising articulated sections forming the upright and horizontally extending portions of said hitch, one of said sections carrying the hitch pin for said fifth wheel, and operable means for moving said sections substantially into continuous alignment respectively between the end of the bed and the trailer supporting surface, said sections being lined with decking to form a loading runway to said bed, and supporting means for said bed disposed adjacent the connected articulated sections of said hitch to hold the bed and runway in operative loading relation.

47. In a trailer, a hitch mechanism disposed above the general plane of the trailer loading bed, link mechanism mounted on said bed and connected with the hitch mechanism to support the latter, latch means coacting between the bed and one of said mechanisms to hold said hitch mechanism in operative raised relation above the bed, release of said latch means permitting lowering of said hitch mechanism through said link mechanism, and power operated means connected with one of said mechanisms to control the lowering of said hitch mechanism and adapted to again raise said mechanism into its original latched position when so operated.

48. In a trailer, a hitch mechanism disposed above the general plane of the trailer loading bed, link mechanism mounted on said bed and connected with the hitch mechanism to support the latter, latch means coacting between the bed and one of said mechanisms to hold said hitch mechanism in operative raised relation above the bed, release of said latch means permitting lowering of said hitch mechanism through said link mechanism, power operated means connected to one of said mechanisms to control the lowering of said hitch mechanism and to raise said mechanism into its original latched position when so operated, said hitch mechanism including a deck to provide a runway, and said link mechanism having a deck to bridge the space between said trailer bed and hitch mechanism runway whereby both decks comprise a continuous runway to said bed when said hitch mechanism has been lowered.

49. In a trailer, the combination of a loading body, a structure connected with said body to provide a hitch when disposed in one position relative thereto, said structure functioning as a ramp approach to said body when disposed in another position with respect thereto, and a retractable pedestal pivotally connected with said structure and adapted to support the latter in either of its positions or during the actuation thereof between said two positions.

50. A gooseneck hitch for a trailer bed and for connection with a towing vehicle comprising articulated sections forming upright and horizontally extending portions of said hitch, one of said sections having coupling means for connection with said towing vehicle, and operative mechanism for moving said articulated sections from towing position into a position in contact with the trailer supporting surface to form a continuous runway from the trailer bed for loading the latter.

51. In a trailer, the combination of a carrying bed, a structure connected with said bed to provide a hitch when disposed in one position relative to said bed, said structure functioning as a ramp approach to the bed when disposed in another position with respect to said bed, operable mechanism connected with said structure to actuate the latter from one to the other of said positions, and bed supporting means to hold said bed at a predetermined level above the roadway while the structure is being actuated into either one of its aforementioned positions.

52. A trailer comprising, a main frame, a supplemental frame, upper and lower series of links pivoted at one end to the main frame and at their other ends to the supplemental frame, flooring on the frames and the upper series of connecting links and forming load supporting surfaces, said supplemental frame being movable to declining position to form a loading and unloading ramp and being movable to elevated position to form a tractor hitch.

53. A trailer comprising, a main frame, a supplemental frame, upper and lower series of links pivoted to the respective frames whereby the supplemental frame may be moved to declining position with the upper series of links above the lower series of links, said supplemental frame being movable to elevated position to form a tractor hitch, said links being so arranged that the lower series of links will be located in front of the upper series of links when said supplemental frame is in said elevated position, releasable means for locking said supplemental frame in said elevated position.

54. A trailer comprising, a main frame, a supplemental frame, upper and lower series of links pivoted to the respective frames whereby the supplemental frame may be moved to declining position with the upper series of links above the lower series of links, said supplemental frame being movable to elevated position to form a tractor hitch, said links being so arranged that the lower series of links will be disposed forwardly of the upper series of links when said supplemental frame is in said elevated position, releasable means for locking said supplemental frame in said elevated position and flooring on said frames and upper links forming load supporting surfaces.

55. In a trailer, a main frame including a loadbed provided with parallel side pieces, each of said side pieces being formed at one end with a cut-out portion, the cut-out portions of the respective pieces being oppositely disposed, running gear supporting one end of said frame, and combined hitch and ramp means mounted at the other end of said frame adapted for coupled engagement with a tractor vehicle, said means being movable to a transport position such that said means is elevated for said coupled engagement with a tractor vehicle and being movable to a loading position such that said means is lowered whereby the end thereof may rest on the ground and the means serve as a ramp, fluid operable means for effecting the movement of said hitch and ramp means, and latch means for releasably securing said hitch and ramp means in said transport position, said latch means including slidable heads adapted to engage the edges of said side pieces, said heads being operable over the ends of said side pieces and into and out of the cut-out portions thereof and means in connection with said heads for imparting sliding movement thereto.

56. In a trailer, a main frame including a loadbed provided with parallel side pieces, each of said side pieces being formed at one end with a cut-out portion, the cut-out portions of the respective pieces being oppositely disposed, a hitch and ramp member having means for coupling same to a tractor vehicle, said member having a deck for supporting objects to be loaded onto the trailer, a link structure connecting said member and said frame, said member and said structure being movable to a position such that said hitch and ramp member extends in a plane above said frame convenient for coupling same to a tractor vehicle and being movable to a position such that said hitch and ramp member and said structure extends below said frame in a plane angularly disposed to the plane of the loadbed whereby the ramp and hitch member may rest on the ground and the ramp and hitch member and said structure serve as a ramp for loading and unloading the trailer, latch means for releasably securing said hitch and ramp member and said structure in said first mentioned position, said latch means including slidable heads adapted to engage the edges of said side pieces, said heads being operable over the ends of said side pieces into and out of the cut-out portions thereof, means in connection with said heads for imparting sliding movement thereto, and fluid operable means for effecting the movement of said hitch and ramp member and said structure.

57. In a trailer, the combination of a carrying bed, a forward structure connected with said bed to provide a hitch when disposed in one position relative to said bed, said structure functioning as a ramp approach to the bed when disposed in another position with respect to said bed, power operated mechanism connected with said forward structure to actuate the latter from one to the other of said positions, releasable latch means to lock and hold said structure when moved into one of its aforesaid positions, a rearward structure detachably connected with the rear of said carrying bed, said rearward structure being vertically offset with respect to the general plane of said carrying bed to provide increased road clearance, and a spring mounted running gear disposed under said rearward structure and having pneumatic tires of large diameter.

58. In a trailer the combination with a loading bed provided with parallel side pieces, each of said side pieces being formed at one end with a cut-out portion, the cut-out portions of the respective pieces being oppositely disposed, a structure connected with the front end of said bed, said structure being adjustable to provide a hitch when in raised and a loading ramp when in lowered position and means in connection with said bed and structure to raise and lower the latter; of a latch mechanism for locking said structure in one of its positions, said mechanism including slidable heads adapted to engage the edges of said side pieces, said heads being operable over the ends of said side pieces and into and out of the cut-out portions thereof and means in connection with said heads for imparting sliding movement thereto.

59. In a trailer the combination with a loading bed provided with parallel side pieces, each of said side pieces being formed at one end with a cut-out portion, the cut-out portions of the respective pieces being oppositely disposed, a structure connected with the front end of said bed, said structure being adjustable to provide a hitch when in raised and a loading ramp when in lowered position and means in connection with said bed and structure to raise and lower the latter; releasable latch means for locking said structure in one of its positions, said means including slidable latch elements provided with laterally offset heads adapted to engage the edges of said side pieces, said heads being operable over the ends of said pieces and into and out of the cut-out portions thereof as sliding movement is imparted to said latching elements and means in connection with said latch element to cause the sliding movement.

60. In a trailer the combination with a loading bed provided with parallel side pieces, each of said side pieces being formed at one end with a cut-out portion, the cut-out portions of the respective pieces being oppositely disposed, a structure connected with the front end of said bed, said structure being adjustable to provide a hitch when in raised and a loading ramp when in lowered position and means in connection with said bed and structure to raise and lower the latter; of releasable latch means for locking said structure in one of its positions, said means including slidable latch elements provided with laterally offset heads adapted to engage the edges of said side pieces, said heads being operable over the ends of said side pieces into and out of the cut-out portions thereof and manually controlled means in connection with said latch elements for imparting sliding movement thereto.

61. In a trailer the combination with a loading bed provided with parallel side pieces, each of said side pieces being formed at one end with a cut-out portion, the cut-out portions of the respective pieces being oppositely disposed, a structure connected with the front end of said bed and adjustable relative thereto to provide a hitch when in raised and a loading ramp when in lowered position and link mechanism in connection with said bed and structure to raise and lower the latter, said mechanism including parallel plates; of a releasable latch means for locking said structure in one of its positions, said means including slidable latch elements carried by said parallel plates, said elements being formed with laterally offset heads adapted to engage the edges of said side pieces and operable over the ends of said side pieces into and out of the cut-out portions thereof, and an operating lever pivotally attached to one of said parallel plates and connected at its lower end with said latch elements for imparting sliding movement thereto, and a hand grip means attached to the free end of said lever and extending through an opening in said parallel plate to the exterior thereof.

62. In a trailer the combination with a loading bed provided with parallel side pieces, each of said side pieces being formed at one end with a cut-out portion, the cut-out portions of the respective pieces being oppositely disposed, a structure connected with the front end of said bed and adjustable relative thereto to provide a hitch when in raised and a loading ramp when in lowered position and link mechanism in connection with said bed and structure to raise and lower the latter, said mechanism including parallel plates; of a releasable latch means for locking said structure in one of its positions, said means including slidable latch elements carried by said parallel plates, said elements being formed with laterally offset heads adapted to engage the edges of said side pieces and operable over the ends of said side pieces into and out of the cut-out portions thereof, an operating lever pivotally attached to one of said plates and connected with said latch elements to impart sliding movement thereto and spring means connected with said lever for normally retaining the heads of said latch elements in the cut-out portions of said side pieces.

63. A trailer comprising a main frame, a supplemental frame, upper and lower series of links pivoted at one end to the main frame and at their other ends to the supplemental frame, flooring on the frames and the upper series of connecting links and forming load-supporting surfaces, said supplemental frame being movable to declining position to form a loading and unloading ramp and being movable to elevated position to form a tractor hitch.

64. A trailer comprising a main frame, a supplemental frame, upper and lower series of links pivoted to the respective frames whereby the supplemental frame may be moved to declining position with the upper series of links above the lower series of links, said supplemental frame being movable to elevated position to form a tractor hitch, said links being so arranged that the lower series of links will be located in front of the upper series of links when said supplemental frame is in said elevated position, and releasable means for locking said supplemental frame in said elevated position.

65. A trailer comprising a main frame, a supplemental frame, upper and lower series of links pivoted to the respective frames whereby the supplemental frame may be moved to declining position with the upper series of links above the lower series of links, said supplemental frame being movable to elevated position to form a tractor hitch, said links being so arranged that the lower series of links will be disposed forwardly of the upper series of links when said supplemental frame is in said elevated position, releasable means for locking said supplemental frame in said elevated position, and flooring on said frames and upper links forming load-supporting surfaces.

66. A trailer comprising a main frame, a supplemental frame, upper and lower series of links pivoted at one end to the main frame and at their other ends to the supplemental frame, flooring on the frames and the upper series of connecting links and forming load-supporting surfaces, said supplemental frame being movable to declining position to form a loading and unloading ramp and being movable to elevated position to form a hitch for a traction unit, and releasable latches connecting the main frame with the upper series of links when the supplemental frame is in elevated position to lock said supplemental frame in said position.

67. A trailer comprising a main frame, a supplemental frame, upper and lower series of links pivoted to the respective frames whereby the supplemental frame may be moved to declining position with the upper series of links resting on the lower series of links, said supplemental frame being movable to elevated position to form a tractor hitch, said links being so arranged that the lower series of links will be parallel to the upper series of links when said supplemental frame is in said elevated position, and releasable means for locking said supplemental frame in said elevated position.

68. A trailer comprising a main frame, a supplemental frame, upper and lower series of links pivoted to the respective frames whereby the supplemental frame may be moved to declining position with the upper series of links resting on the lower series of links, said supplemental frame being movable to elevated position to form a tractor hitch, said links being so arranged that the lower series of links will be parallel to the upper series of links when said supplemental frame is in said elevated position, releasable means for locking said supplemental frame in said elevated position, and flooring on said frames and links forming load-supporting surfaces.

69. A trailer having a fixed load-carrying platform, a platform section pivotally connected thereto to be turned into substantial alignment with the fixed section and into a position at approximately a right angle thereto, and a front end loading ramp pivotally connected to the part of the platform section remote from its connection with the load-carrying platform, said ramp having a projecting abutment adapted to engage the platform section and limit relative turning movement of the ramp and the section.

WILLIAM E. MARTIN.

REFERENCES CITED

The following references are of record in the file of this patent:

UNITED STATES PATENTS

| Number | Name | Date |
| --- | --- | --- |
| 2,131,949 | Helmig | Oct. 4, 1938 |
| 2,312,769 | Mosling | Mar. 2, 1943 |

FOREIGN PATENTS

| Number | Country | Date |
| --- | --- | --- |
| 284,548 | Great Britain | Feb. 2, 1928 |
| 473,690 | Germany | Mar. 19, 1929 |
| 544,160 | Germany | Feb. 15, 1932 |